United States Patent Office 3,011,882
Patented Dec. 5, 1961

3,011,882
COATED ABRASIVES
James R. Quinan, Watervliet, and James W. Sprague, Melrose, N.Y., assignors to Norton Company, Troy, N.Y., a corporation of Massachusetts
No Drawing. Filed Feb. 27, 1958, Ser. No. 717,813
4 Claims. (Cl. 51—298)

This invention relates to flexible coated abrasives and an improved treated backing for coated abrasives.

It is an object of our invention to provide an improved treated fibrous sheet material.

It is another object of our invention to provide an improved water-proof and heat resistant flexible coated abrasive.

It is a further object of our invention to provide a heat resistant flexible coated abrasive of improved durability.

In the manufacture of flexible coated abrasives having fibrous backings, it is necessary to pretreat the backing to among other things, prevent undue stiffening and degradation of the fabric by absorption of the grit bonding adhesive.

In addition to filling the fibrous web to prevent undesirable saturation of the material by the bonding coat, the impregnant, if properly chosen may also improve existing properties or impart new desirable physical properties to the backing material to aid in producing a stronger more useful, durable and efficient product.

While our invention is applicable to all backings of a fibrous nature, the invention is particularly useful in relation to cloth backings.

The materials used in the past including various synthetic resins, elastomers and rubber for impregnating, treating or presizing coated abrasive backings, although satisfactory for many purposes, have suffered from one or more of the following defects: poor cutting characteristics at elevated temperatures, impaired flexibility, poor adhesion to the bonding coat for the abrasive grits, inherent curl, and lack of sufficient dimensional stability during the grinding operation.

Broadly, our invention proposes the treatment of fibrous backings for the manufacture of coated abrasives, particularly cloth backings, with a coating or coatings such that the resulting backing contains both an elastomer which is a terpolymer of butadiene, acrylonitrile, and styrene and a thermosetting, film forming resin which is compatible with the elastomer. As will presently appear, the elastomer and/or resin may be applied to the fibrous backing in a variety of ways and by the term "coating" we mean to include both impregnation or saturation and mere surface coating or sizing or combinations of both.

Our improved coated abrasive backing material thus comprises a fibrous backing in combination with a thermoplastic elastomer which is a terpolymer of styrene, butadiene and acrylonitrile, and a film forming thermosetting resin which is compatible with the terpolymer.

By compatible with the terpolymer we mean that the resin will form stable solutions or latices with the terpolymer.

The above mentioned thermoplastic elastomer and thermosetting resin may be applied in a variety of ways to the backing sheet, but must both be present to achieve the desired results of our invention. For example, these ingredients may be applied to the backing as a mixture in one step, the terpolymer may be applied first followed by a presize utilizing the resin alone, or the terpolymer may be applied first with a second impregnation of a mixture of the terpolymer and the resin.

The specific terpolymer which we prefer in our invention is the product disclosed in U.S. Patent 2,384,543 of September 11, 1945. The terpolymer may be applied either in the form of a water dispersion (latex) or a solvent solution. As indicated in the following table, we may add small amounts of polystyrene to the specific terpolymer used in our invention. However, as also indicated, substitutes such as mixtures of a butadine-acrylonitrile copolymer with polystyrene are not equivalent to the preferred terpolymer.

| Saturant | Adhesion | Tensile | Remarks |
|---|---|---|---|
| Terpolymer of our invention. | Excellent | Excellent | best results. |
| Butadiene acrylonitrile copolymer and polystyrene (5%). | Satisfactory | Unsatisfactory. | total properties unsatisfactory. |
| Butadiene acrylonitrile copolymer and polystyrene (10%). | Unsatisfactory. | do | Do. |
| Butadiene acrylonitrile copolymer and Butadiene-styrene (5% Total styrene). | do | do | Do. |
| Butadiene acrylonitrile copolymer and Butadiene-styrene (10% total styrene). | do | do | Do |
| Butadiene acrylonitrile copolymer (75% Butadiene) (25% acrylonitrile). | do | do | Do. |
| Butadiene acrylonitrile copolymer (65% Butadiene) (35% acrylonitrile). | do | do | Do. |
| Butadiene-styrene copolymer (15% Butadiene), (85% styrene). | do | do | Do. |
| Butadiene-styrene copolymer (84% Butadiene), (16% styrene). | do | do | Do. |
| Terpolymer of our invention plus 5% polystyrene (Hycar 2507). | Good | Excellent | Satisfactory. |
| Terpolymer of our invention plus 10% polystyrene (Hycar 2507). | Very Good | do | Do. |

The tremosetting, film forming resins which are useful in our invention include compatible phenol-aldehyde resins, urea aldehyde resins, epoxy resins compounded with suitable hardening agents, alkyd resins including an unsaturated component compouded with suitable driers, polyamide resins with suitable catalysts, or other similar type resins which when set up in the cured condition do not soften or solubilize appreciably under the conditions of use of the coated abrasive product, are compatible with the terpolymer and impart physical strength to the combination backing. By the term thermosetting we mean to include resins that are substantially infusible or insoluble when cured under application of heat or chemical means.

In applying our invention to fiberous backings, in particular to cloth backings, as in the examples which are to follow, we find that when a two step saturation process is employed, the amount of terpolymer applied in the first step should amount to at least 20% and preferably at least 30% of the original cloth weight. When the amount of saturant is reduced to below 20%, the product is liable to be unduly brittle. Although we have found that the physical limit of the upper range of first saturant content is about 54% by weight, this limitation exists only because of the processing equipment employed, and it has been our experience that this upper limit may vary over a wide range and in excess of this processing limitation by a simple substitution of different saturating or impregnating equipment.

In general, with all types of fibrous backing material, we have found that the weight ratio of total thermosetting resin solids to total terpolymer solids in the improved backing material of our invention may vary from 1 to 30 parts of thermosetting resins per 100 parts of terpolymer. When using a two-step saturation, we have found that the properties of the finished product continue to be superior when as much as 70% by weight of the second saturant solids consists of the thermosetting resin.

We have further found that when the combination saturant is applied in one step, the ratio of resin to terpolymer may vary from 1 to 11 parts of resin solids per 100 parts of terpolymer solids.

*Backing element Example No. 1*

This example of our invention will illustrate the improvements obtained when a compatible thermosetting phenol formaldehyde resin and butadiene acrylonitrile styrene terpolymer is applied to a cloth backing in a two step saturating procedure.

A cloth backing is employed having a thread count of 76 x 48 which in a 42 inch width will yield 1.97 yds./lb. This material is desized and boiled off by methods commonly used in the textile industry and subsequently dyed and dried prior to the saturating treatment.

The thusly prepared cloth backing is then impregnated with a butadiene acrylonitrile and styrene terpolymer in which the ratio of the monomers is approximately 70:25:5 respectively. This impregnating media is applied in the form of a latex emulsion of approximately 40% solids content. The cloth backing is first dipped in the latex emulsion and subsequently squeezed of excess liquor by a two roll coater so that approximately 35% of said latex is retained in the cloth. The fabric after being squeezed of excess impregnant continues along to another application of the latex in which approximately 5% is applied to the twill side of the fabric by means of a metering or transfer roll so that 5.6 lbs./sandpaper ream of terpolymer solids is retained in the cloth. This saturated backing then continues into a forced air oven and is dried for 5–6 minutes at approximately 200° F., or at some other convenient temperature for a period of time until the cloth becomes tack free.

After this drying operation the impregnated material is then subjected to a second saturation with a mixture of the above identified terpolymer and a liquid thermosetting alkaline catalyzed phenol formaldehyde resin, in a 1:1 ratio, based on the solids content of the two components.

This mixture is applied to the square side of the fabric in the form of a 30% solution with a transfer or metering roll to the extent of 5–6% solids. It then passes into a second bath of the same composition in like manner so that 4–5% solids is retained and a composite saturation in the second step amounts to a 1.4 lbs./sandpaper ream of terpolymer-phenolic mixture based on the original cloth weight. The saturated backing continues into a forced air oven and is dried at approximately 200° F. until it is tack free (5 minutes). It is then taken down in roll form.

This saturated backing is then subjected to a backsize solution to the twill side of the cloth containing a mixture of 100 parts of a resin made according to Example No. 2 of U.S. 2,184,896 and 75 parts calcium carbonate filler according to U.S. 2,322,156 and applied to the cloth in such a manner that approximately 10% solids based on the original cloth is retained. The backsized cloth then proceeds to a forced draft oven and is dried for 1½ hrs. at 120° F. and 1½ hrs. at 170° F.

The backsized cloth is then given a presize to the square side of the cloth with the same solution and for the same drying period as that used to backsize the saturated cloth.

The resin mixed with the elastomer for use in the second step of the saturation described above was prepared according to the following procedure:

A vessel equipped with a reflux condenser, agitator and thermometer was charged with the following materials:

630 g. phenol
1087 g. formaldehyde (37% aqueous solution)
36 g. NaOH (40% aqueous solution)

These ingredients were heated at a uniform rate of increase in temperature up to the reflux temperature (98° C.) in a period of 23 minutes. When this temperature was reached it was maintained at 98° C. for 10 minutes and then between 95–98° C. for an additional 56 minutes. After this period the resin was cooled to 30° C., the system placed under a vacuum to dehydrate the resin solution and was held at 25–30° C. for a period of 6 hours. This resin is obtained at 67.3% solids and has a viscosity of 650 cps. at 25° C.

When this cloth of our invention was tested for adhesion, tensile strength and flexibility, a considerable improvement in flexibility with excellent adhesion and tensile strength was obtained when compared to standard products now available and known in the prior art.

*Backing element Example No. 2*

This example will illustrate the incorporation of the teachings of our invention when the terpolymer and phenolic resin is applied in a one-step saturation.

The preparation of the cloth backing and the backing, per se, are the same as that described in Example No. 1.

The prepared cloth is impregnated with a mixture of the terpolymer and phenolic resin, as described in the second step of the saturation of Example No. 1, but in which the ratio of said terpolymer to phenolic is 9:1, and is applied as a 35% latex emulsion by means of a dip saturation. The thus saturated cloth is subsequently squeezed by padder rolls to remove the excess liquor, so that the saturated cloth contains 4.9 lbs./sandpaper ream of saturant solids. The saturated cloth is then dried on a set of drying cans, commonly used in the textile industry for such purposes, until the cloth is tack free.

The said saturated cloth is then backsized, dried and cured in the manner described in Example No. 1 above.

*Backing element Example No. 3*

This example will illustrate our invention when the butadiene, acrylonitrile and styrene terpolymer is used as a saturant followed by a presize of the thermosetting phenolic resin in surface contant with said terpolymer.

The cloth, per se, and its preparation prior to saturation is identical to that described in Examples No. 1 and No. 2 above.

The prepared cloth is passed through a bath of a 40% emulsion of a butadiene, acrylonitrile and styrene terpolymer in which the ratio of the three monomers is 70:25:5, respectively. The immersed cloth is then squeezed of the excess elastomeric emulsion in such a manner that 5.6 lbs./sandpaper ream of the terpolymer, based on the original cloth weight, is retained. The saturated cloth then continues on to a set of drying cans where it is dried under tension until it becomes tack free.

The terpolymer saturated fabric is then presized on the square side with a solution of 25.6 parts of a resin made according to Example No. 2 of U.S. Patent 2,184,896, issued on December 26, 1939, and 74.4 parts of a mixture of denatured ethanol and water in a ratio of 20 parts of the former to 80 of the latter. This resin solution is laid up on the fabric by means of a knife or metering roll to the extent of 0.7 lb./sandpaper ream of resin solids. The presized cloth is again dried under tension until it becomes tack free.

The presized cloth is backsized, squeezed, dried and cured in like manner to Examples No. 1 and 2 above.

*Coated abrasive example*

In the manufacture of waterproof cloth according to this example of our invention we employ as a backing a cloth web prepared according to "Backing element Example No. 1" above.

The adhesive used to coat this backing as a binder adhesive consists of a mixture of 52 parts, by weight, of the resin prepared according to Example No. 1 of U.S. Patent 2,184,896 and 48 parts, by weight, of the resin prepared according to Example No. 2 of the patent. This mixture is made to contain 83.5% solids and yields a viscosity of approximately 1000 cps. at 130° F. The adhesive may be applied to the prepared backing, previously described, at a temperature of 130° F. or some other convenient temperature, after which 27.3 lbs. of Grit 60 silicon carbide abrasive grain is applied to the maker coat of adhesive on the backing by conventional means.

The web coated with a making coat of adhesive and the abrasive grain is moved into a conventional sandpaper drying room and heated for 2½ hrs. at 150° F. plus 1½ hrs. at 225° F. to cure the binder.

After the binder has been so cured, the abrasively coated web is moved through a conventional sandpaper sizing machine where the sizing coat of adhesive is added. In this example the sizing coat consists of 35 parts, by weight, of the resin prepared according to Example No. 1 of U.S. Patent 2,184,896 and 65 parts of the resin prepared according to Example No. 2 of said specification. This mixture is adjusted so that to each 86 parts of the combination 14% denatured ethanol are added. The size may be applied in the conventional apparatus at a temperature of 90° F., however this temperature is not critical and is subject to variation according to other operating conditions.

The amount of the size added is controlled partly by weight but, to a greater extent, by the ability of the operator to judge the size. Curable contents of a sizing solution of about 1.8 lbs. per ream are usually quite satisfactory. After this sizing operation the web is again passed to a conventional sandpaper drying room and heated to cure the resin. A satisfactory cure of the binders after the sizing operation may be obtained by heating for about 8 hours at about 225° F., but those skilled in the art will appreciate that a number of variations may be made in the time and temperature of the curing cycle.

The product made according to the above procedure was more flexible than any other known waterproof coated abrasive cloth and possessed excellent cutting characteristics on steel and glass.

In lieu of the "Backing element Example No. 1" above, the backing element of Example 2 or 3 may be used.

We may also substitute other compatible thermosetting resin adhesives in place of the phenol aldehyde adhesive used in "Backing element Examples Nos. 1, 2 and 3" above. Typical of such adhesive is the urea aldehyde adhesive prepared as described in U.S. Patent 2,534,806 to C. S. Webber et al., issued December 19, 1950.

We claim:

1. A woven cloth backing element adapted to be coated with abrasive grain to form a flexible coated abrasive, said woven cloth being coated with an elastomer which is a terpolymer of butadiene, acrylonitrile, and styrene containing at least 5% of combined styrene by weight, and a film forming thermosetting, strength imparting resin, compatible with said elastomer, selected from the group consisting of phenol-aldehyde resins, urea-aldehyde resins, epoxy resins, alkyd resins, and polyamide resins, said backing element containing said thermosetting resin in an amount of from 1 to 30 parts of resin for every 100 parts of elastomer, said thermosetting resin being present at the surface of said element on at least one side thereof and said elastomer being present at the interface between said woven cloth and the coating material.

2. A woven cloth backing element adapted to be coated with abrasive grains to form a flexible coated abrasive sheet, said woven cloth being provided with a first coating consisting of an elastomer which is a terpolymer of butadiene, styrene, and acrylonitrile, containing at least 5% combined styrene by weight, and said woven cloth being provided with a second coating overlying said first coating which is a mixture of said elastomer and a film forming, strength imparting, thermosetting resin, compatible with said elastomer selected from the group consisting of phenol-aldehyde resins, urea-aldehyde resins, epoxy resins, alkyd resins, and polyamide resins, the thermosetting resin being present in an amount of from 1 to 30 parts of resin for every 100 parts of total elastomer, by weight, in the backing.

3. A woven cloth backing element adapted to be coated with abrasive grains to form a flexible coated abrasive sheet, said woven cloth being provided with a first coating of an elastomer which is a terpolymer, containing at least 5% by weight of combined styrene, of butadiene, acrylonitrile, and styrene, and overlying said first coating, a second coating consisting of a film forming, strength imparting, thermosetting resin which is compatible with said elastomer, selected from the group consisting of phenol-aldehyde resins, urea-aldehyde resins, epoxy resins, alkyd resins, and polyamide resins, there being present in the backing from 1 to 30 parts of said resin for every 100 parts of elastomer, by weight.

4. A flexible coated abrasive sheet comprising: a woven cloth backing sheet precoated with an elastomer which is a terpolymer of butadiene, styrene, and acrylonitrile, containing at least 5% of combined styrene by weight, and a film forming, strength imparting, thermosetting resin compatible with said elastomer, selected from the group consisting of phenol-aldehyde resins and urea-aldehyde resins, and a resinous bonding coat selected from the group consisting of phenol-aldehyde resins and urea-aldehyde resins on one side of said backing sheet; a plurality of abrasive grains bonded by said bonding coat; said sheet containing said film forming resin, exclusive of said bonding coat, in an amount of from 1 to 30 parts of resin per 100 parts of elastomer, said film forming resin being present at the interface between the precoating material and said bonding coat, said elastomer being present at the interface between said woven cloth and the precoating material.

References Cited in the file of this patent

UNITED STATES PATENTS

| | | |
|---|---|---|
| 2,357,335 | Kugler et al. | Sept. 5, 1944 |
| 2,384,547 | Fryling | Sept. 11, 1945 |
| 2,400,036 | Wooddell et al. | May 7, 1946 |
| 2,527,162 | Vanderbilt et al. | Oct. 24, 1950 |
| 2,752,739 | Von Doenhoff | July 3, 1956 |
| 2,791,571 | Wheelock | May 7, 1957 |
| 2,880,184 | Groves | Mar. 31, 1959 |